J. B. KNICKERBOCKER.
MULTIPLE CONE CLUTCH.
APPLICATION FILED JAN. 13, 1913.
1,091,351.
Patented Mar. 24, 1914.
2 SHEETS—SHEET 1.
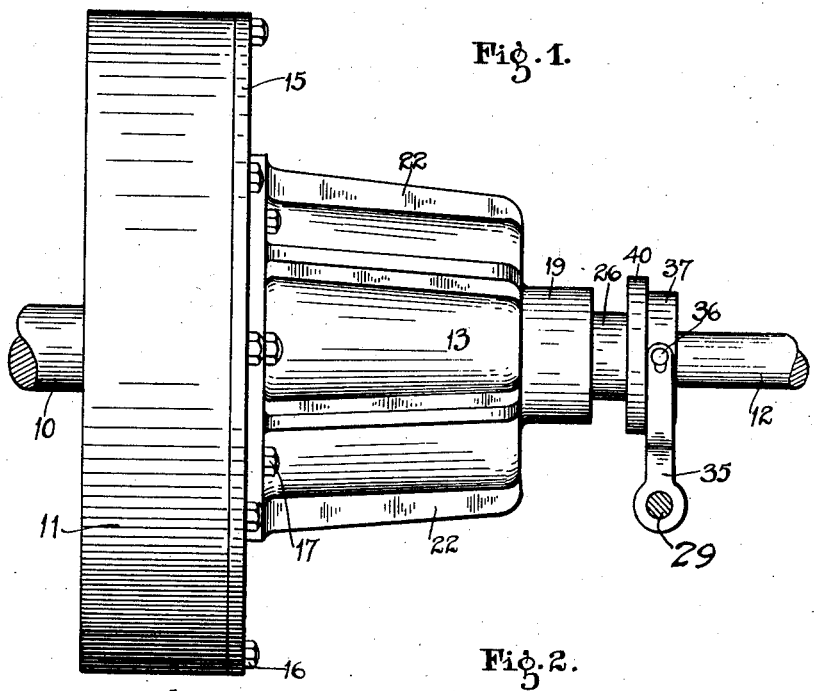
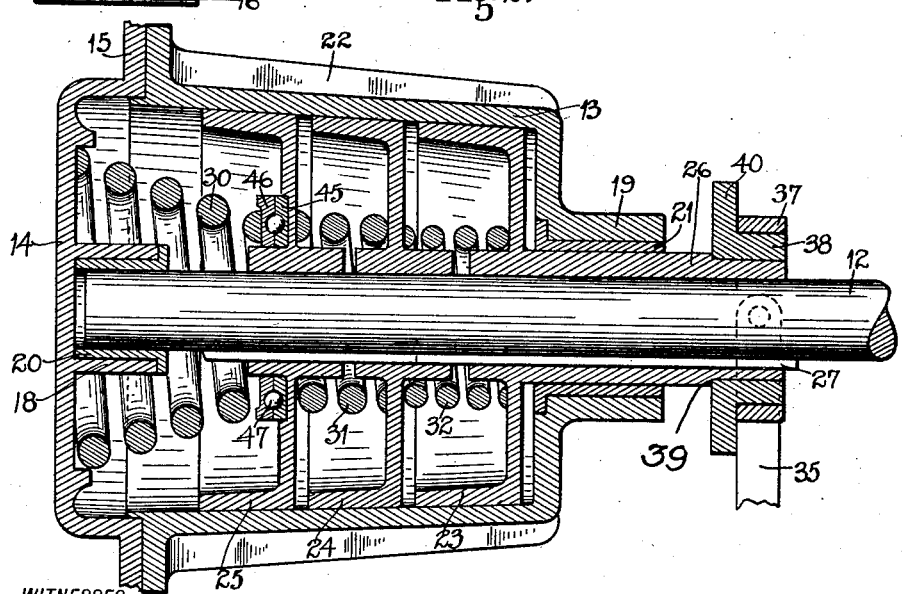
WITNESSES:
INVENTOR
JAMES B. KNICKERBOCKER.
BY
ATTORNEY

J. B. KNICKERBOCKER.
MULTIPLE CONE CLUTCH.
APPLICATION FILED JAN. 13, 1913.

1,091,351.

Patented Mar. 24, 1914.

2 SHEETS—SHEET 2.

WITNESSES:

INVENTOR
JAMES B. KNICKERBOCKER.

BY
ATTORNEY

UNITED STATES PATENT OFFICE.

JAMES B. KNICKERBOCKER, OF INDIANAPOLIS, INDIANA.

MULTIPLE-CONE CLUTCH.

1,091,351.  Specification of Letters Patent. Patented Mar. 24, 1914.

Application filed January 13, 1913. Serial No. 741,736.

*To all whom it may concern:*

Be it known that I, JAMES B. KNICKERBOCKER, a citizen of the United States, and a resident of Indianapolis, county of Marion, and State of Indiana, have invented a certain new and useful Multiple-Cone Clutch; and I do hereby declare that the following is a full, clear, and exact description thereof, reference being had to the accompanying drawings, in which like letters refer to like parts.

The object of this invention is to improve the construction and operation of friction clutches, particularly of the cone friction clutch type, so that there will be both a gradual and yielding clutching and unclutching action of the clutch.

The chief feature of the invention consists in providing a series of coöperating cone friction members, in the clutch mechanism, which are spring controlled and also which are arranged so that they go into and out of clutching position in succession, instead of simultaneously. Therefore, in the first step of the clutching operation, only one cone is brought into clutching engagement, and then the others in succesive steps. Consequently the extent of friction surface in engagement gradually increases in the clutching operation and gradually decreases while unclutching.

Another feature of the invention consists in mounting a plurality of cone friction members on the same shaft in succession and independently of each other and providing springs for actuating them into clutching position, the springs for all excepting one cone friction member, lying between the pair of said members so that the springs will act on the members in succession. Thus one clutch member will be forced into clutching position by its spring, and then that clutching member, through another spring, will force the third clutching member into clutching position. And along with the foregoing idea is the further idea of making the springs of different power or tension, the series diminishing in the order above indicated, each spring being stronger than the spring which succeeds it.

The nature of the invention will be understood from the accompanying drawings and the following description and claims.

Figure 3:
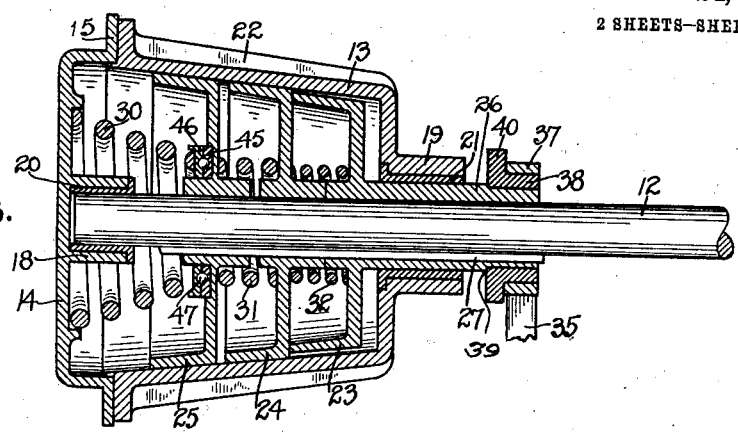
Figure 4:
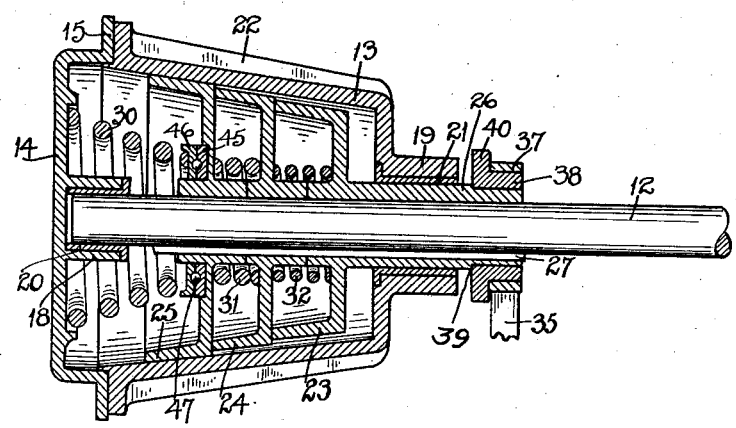
Figure 5:
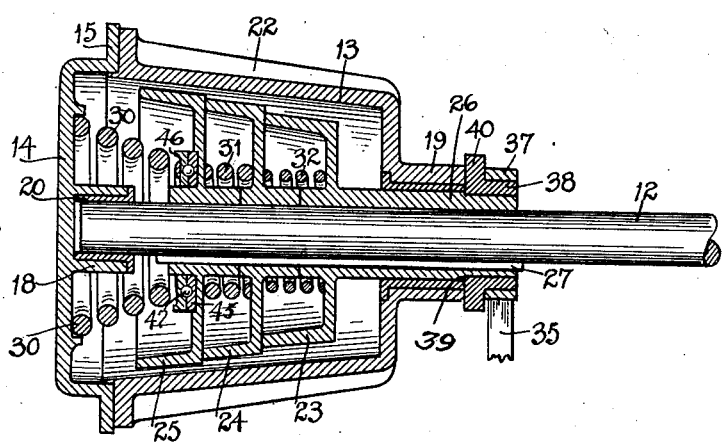

In the drawings, Figure 1 is a side elevation of the whole device, the shafts being partially broken away. Fig. 2 is a central longitudinal section through the clutching mechanism with all parts in clutching condition. Fig. 3 is the same showing one clutching member out of engagement, being the first step in unclutching the device. Fig. 4 is the same showing two clutching members out of engagement, being the second step in the unclutching. Fig. 5 is the same showing all of the clutching members out of engagement.

In detail the mechanism herein shown to illustrate the invention has a main driving shaft 10 which may be the engine shaft, and a fly wheel 11 thereon. The remainder of the mechanism may be considered the clutch mechanism. There is a driven shaft 12 which extends loosely into a casing secured to the fly wheel. The casing is composed of two members 13 and 14 and the member 14 has a radially extending flange 15 which is secured to the side of the fly wheel by bolts 16. The members 13 and 14 are secured together by bolts 17. The member 14 of this casing has an inwardly extending thimble 18 which serves as a bearing for the inner end of the shaft 12, while there is a bearing sleeve 19 at the other end of the casing surrounding the shaft 12. These bearings have bushings 20 and 21 in them. The casing member 13 tapers slightly and on the outside it has reinforcing ribs 22 to make it perfectly rigid.

Within the casing there are three cone friction members 23, 24 and 25, each having a hub and the smaller one having an elongated sleeve-like hub 26. These hubs are splined on the shaft 12 by a feather 27, so that said friction members may be moved longitudinally of the shaft, but turn therewith.

There is a spiral spring 30 lying between the large friction member 25 and the casing member 14 which tends to force said friction member against the tapering casing member 13 and clutch them together. There is also a spiral spring 31 lying between the friction members 24 and 25 so that, through this spring, the friction member 25 tends to force the friction member 24 into clutching position. There is also another spiral spring 32 lying between the friction members 23 and 24 so that the friction member 24 tends to force the friction member 23 into clutching position. The spring 30 is heavier and more powerful than the spring 31 and the spring 31 is heavier and more powerful than the spring 32. The wire forming these springs varies in diameter so as to vary the power of the springs as suggested. Therefore, the spring 30 is not only strong enough to force the friction member 25 into clutching position, but also all of the other friction members. And the spring 31 is strong enough not only to force the friction member 24 into clutching position, but also the friction member 23. Hence, it is noted that the spring 30 has more work to do than the spring 31 and, therefore, the diameter of the wires of the springs is varied so that they will furnish the different degrees of power necessary to do these different degrees of work and force the various friction members into clutching position with substantially a uniform or equal force.

The friction members are disengaged from the clutching position by a shifting lever 35 on an oscillatory rod 29, and the lever has a yoke pivoted by the pins 36 to a ring 37 on a reduced portion of a collar 38. The collar is secured on the reduced outer end of the sleeve 26 and bears against a shoulder 39 on the inside. The collar 38 also has a radial flange 40 against which the ring 37 bears at the inner side, so that, through the shifting lever 35, power may be employed to shift the sleeve 26 inward for unclutching purposes.

The unclutching operation is illustrated in Figs. 3, 4 and 5. At the beginning of the operation the shifting lever 35 disengages only the smaller friction member 23 because there is no means for transmitting power directly from the shifting lever to the other friction members 24 and 25 until the spring 32 has yielded sufficiently to cause the friction member 23 to abut against the friction member 24. Then the further continued movement of the lever 35 will, through said friction member 23, disengage the friction member 24, as shown in Fig. 4, and when its spring has collapsed sufficiently, the friction member 24 will push the friction member 25 out of engagement and overcome the spring 30. Thus it is seen that the disengaging or unclutching of the friction members is gradual or successive and, therefore, the surface and clutching or frictional contact is gradually reduced.

When it is desired to throw the clutch into operation, the shifting lever 35 is released and then the springs will successively actuate the friction members and force them into clutching position. In this clutching operation, the spring 30, being most powerful, will first throw the friction member 25 into clutching position, as shown in Fig. 4, and thereafter the spring 31 will throw the friction member 24 into clutching position, as shown in Fig. 3, and thereafter the spring 32 will throw the friction member 23 into clutching position, as shown in Fig. 2.

Since the shaft 12 and friction member 25 do not always rotate and the strong spring 30 will rotate with the casing, it is necessary to have easy bearing between the friction member 25 and said spring. This bearing consists of a plate 45 secured to the friction member, a plate 46 against which the small end of the spring bears, and bearing balls 47 between said plates.

It is to be understood further that the friction members in this apparatus run in oil, the casing being partially filled with oil, about half full. It is also to be noted the preferable construction of the clutch is such that one friction member will not clutch tightly enough to carry the load, but will slip to a greater or less degree and only partially carry the load. Two friction members when in clutching position, will carry more of the load and in the case of an automobile, drive it faster, picking up speed as compared with the action of one friction member. The three friction members, however, will carry the full load at full speed. This renders the action of the clutch gradual and smooth instead of being jerky or intermittent or irregular in its action.

I claim as my invention:

1. A clutch including a tapering non-slidable clutch member, a shaft, a series of cone friction members slidable on said shaft and spaced apart when clutching said non-slidable clutch member, springs between said friction members, means for moving a friction member at one end of the series into clutching position so that the springs will move the other friction members into clutching position, and means for disengaging the friction member at the other end of the series from clutching position and overcoming the action of said springs successively for disengaging the other friction members.

2. A clutch including a tapering non-slidable clutch member, a shaft, a series of cone friction members slidable on said shaft and spaced from each other when clutching said non-slidable clutching member, springs between said friction members, a spring for moving a friction member at one end of the series into clutching position and through said springs successively moving the other friction members into clutching position, and means for disengaging the friction member at the other end of the series and overcoming the action of said springs and moving the friction members against each other for disengaging said friction members successively.

3. A clutch including a tapering non-slidable clutch member, a shaft, a series of cone friction members slidable on said shaft and spaced from each other when clutching said non-slidable clutching member, springs between said friction members, a spring for moving a friction member at one end of the series into clutching position and through said springs successively moving the other friction members into clutching position, said springs diminishing in power from said first acting spring to the other end of the series of springs, and means for disengaging the friction member which is actuated by the weakest spring at the other end of the series and overcoming the action of said springs and moving the friction members against each other for disengaging said friction members successively.

4. A clutch mechanism consisting of a non-slidable casing having a tapering portion with external reinforcing longitudinal ribs, a shaft operating within said casing, a series of cone friction members slidably mounted on said shaft within said casing in position to be spaced apart when clutching the inner wall of said casing, springs between said friction members, a spring for moving a friction member at one end of the series into clutching position and through said springs successively moving the other friction members into clutching position, said springs diminishing in power from said first acting spring to the other end of the series of springs, and means for disengaging the friction member which is actuated by the weakest spring at the other end of the series and overcoming the action of said springs and moving the friction members against each other for disengaging said friction members successively.

5. A clutch mechanism including a casing formed of a radial end portion and a tapering portion extending therefrom, a shaft with its end projecting into said casing, a bearing for the end of said shaft secured to the radial portion of the casing, a series of cone friction members slidably mounted on said shaft within said casing and each of said friction members having a hub and the smallest of them having a hub projecting through and having bearing in the smaller end of the casing and the friction members arranged so that when clutching their hubs they will be spaced apart, springs lying between said friction members and around their hubs, a spring lying between the largest friction member and the end of the casing, said spring being stronger than the other springs and the series of springs being weaker substantially in proportion to the number of the successive friction members, and a shifting lever operably connected with the outwardly extending end of the hub of the smallest friction member, whereby said friction members may be shifted and disengaged.

In witness whereof, I have hereunto affixed my signature in the presence of the witnesses herein named.

JAMES B. KNICKERBOCKER.

Witnesses:
Ju. H. WELLS,
O. M. McLAUGHLIN.

Copies of this patent may be obtained for five cents each, by addressing the "Commissioner of Patents, Washington, D. C."